United States Patent [19]

Ohta et al.

[11] Patent Number: 4,554,174
[45] Date of Patent: Nov. 19, 1985

[54] PROCESS FOR PRODUCING RADIATION CURABLE ADHESIVE TAPE

[75] Inventors: Tomohisa Ohta; Akihiko Dobashi; Hisashige Kanbara, all of Shimodate; Yasuyuki Seki, Hitachi, all of Japan

[73] Assignee: Hitachi Chemical Company, Tokyo, Japan

[21] Appl. No.: 678,046

[22] Filed: Dec. 4, 1984

[30] Foreign Application Priority Data

Dec. 9, 1983 [JP] Japan .................................. 58-233373

[51] Int. Cl.[4] .............................................. B05D 3/06
[52] U.S. Cl. ........................................ 427/44; 427/36; 427/54.1; 427/208.8; 427/302
[58] Field of Search ............... 427/36, 44, 54.1, 208.8, 427/302

Primary Examiner—Bernard D. Pianalto
Attorney, Agent, or Firm—Antonelli, Terry & Wands

[57] ABSTRACT

In a process for producing a radiation curable pressure sensitive adhesive tape, when a quaternary ammonium salt is coated on a substrate as an undercoating before the coating of an adhesive composition comprising a liquid oligomer and a thiol compound, the resulting adhesive tape has good adhesive strength and higher cohesion with no unpleasant odor of the thiol compound.

6 Claims, No Drawings

PROCESS FOR PRODUCING RADIATION CURABLE ADHESIVE TAPE

BACKGROUND OF THE INVENTION

This invention relates to a process for producing a radiation curable adhesive tape.

Pressure sensitive adhesive tapes have been produced conventionally by coating an adhesive composition prepared by dissolving a natural rubber, a synthetic rubber, or the like in an organic solvent on a substrate made from paper, plastic film, or the like, drying and winding up the substrate on a reel.

But, from the recent demands for saving resources, saving energy and preventing environmental pollution, there has been studied the use of solventless adhesive compositions. As one example of such solventless adhesive compositions, a radiation curable pressure sensitive adhesive has been noticed. This is because the radiation curable pressure sensitive adhesive does not contain an organic solvent principally, that is, to make solventless becomes possible, or even if contained, in a very small amount, and further there are the following advantages in that (1) since radiation which is active energy rays is used, crosslink (polymerization) is fast, (2) since the curing reaction only proceeds when exposed to radiation, the life to use can be controlled freely, and (3) no large drying furnace is necessary during the production of adhesive tapes.

For example, Japanese Patent application Kokai (Laid-Open) No. 10667/82 discloses an adhesive tape obtained from a compound having a vinyl group and a polyfunctional thiol compound, and having good cured properties by exposure to radiation and high cohesion and adhesive properties. Good adhesive properties seems to be resulted from high sensitivity of the SH group in the polyfunctional thiol compound to radiation and competition of the reaction between the vinyl group and the SH group and the chain polymerization-like reaction of vinyl groups each other, which results in making the distance between crosslinking points of cured product longer, and forming rubber-like structure. But in the case of such an adhesive composition containing a thiol compound, even if sufficiently cured by radiation, there remain an unpleasant odor specific to the thiol compound; this is a problem to be solved.

SUMMARY OF THE INVENTION

It is an object of this invention to provide a process for producing a radiation curable adhesive tape having higher cohesion and adhesive properties without causing an unpleasant odor due to thiol compounds.

This invention provides a process for producing a radiation curable adhesive tape by coating a pressure sensitive adhesive composition comprising a liquid oligomer having one or more radically crosslinkable unsaturated double bonds in its molecule and a thiol compound on a surface of a substrate and exposing said composition to radiation, characterized in that a quaternary ammonium salt is coated on a surface of substrate as an undercoating before the coating of the pressure sensitive adhesive composition.

DESCRIPTION OF THE PREFERRED EMBODIMENTS

The radiation curable liquid oligomer has one or more radically crosslinkable unsaturated double bonds at terminals or side chains of molecule.

Examples of such oligomers are oligomers obtained by copolymerizing an acrylic acid alkyl ester or a methacrylic acid alkyl ester as main chain to a lower degree of polymerization; acrylic oligomers such as a polyol acrylate, a polyester acrylate, a urethane acrylate, an epoxy acrylate, etc.; polybutadiene, polychloroprene, polyisoprene, etc.

These oligomers are liquid at room temperature and thus can be used without adding a solvent thereto or even if added, with a very small amount of a solvent.

These liquid oligomers can be synthesized as follows:

(1) A process comprising copolymerizing an acrylic acid ester, a monomer having a carboxylic group, and if necessary, other monomer(s) in a suitable organic solvent by a conventional solution polymerization, and then reacting a part of carboxyl groups of the resulting copolymer with a monomer having an epoxy group in the presence of a polymerization inhibitor and a catalyst to introduce olefinic unsaturated bonds into side chains.

(2) A process comprising copolymerizing an acrylic acid ester, a monomer having an epoxy group, and if necessary other monomer(s), and reacting a part of epoxy groups of the resulting copolymer with a monomer having a carboxyl group to introduce olefinic unsaturated bonds into side chains.

(3) A process comprising copolymerizing an acrylic acid ester, a monomer having a hydroxyl group, and if necessary other monomer(s), and reacting a part of hydroxyl groups of the resulting copolymer with a 1:1 addition reaction product (half urethane) of a diisocyanate such as tolylene diisocyanate, hexamethylene diisocyanate, or the like and a monomer having a hydroxyl group to introduce olefinic unsaturated bonds into side chains.

(4) A process of either (1), (2) or (3) mentioned above, wherein a part of the monomer having a carboxyl group in (1), a part of the monomer having an epoxy group in (2), or a part of the monomer having an hydroxyl group in (3) is replaced by a monomer having an amino group.

The acrylic ester compound to be used includes, for example, methyl acrylate, methyl methacrylate, ethyl acrylate, ethyl methacrylate, butyl acrylate, butyl methacrylate, isobutyl acrylate, isobutyl methacrylate, octadecyl acrylate, octadecyl methacrylate, 2-ethylhexyl acrylate, 2-ethylhexyl methacrylate, etc. In this invention, it is preferable that such an acrylic ester compound is present in the main chain of the oligomer in an amount of 60% by weight or more.

The monomer having a carboxyl group includes, for example, acrylic acid, methacrylic acid, etc. The monomer having an epoxy group includes, for example, glycidyl acrylate, glycidyl methacrylate, etc. The monomer having a hydroxyl group includes, for example, 2-hydroxyethyl acrylate, 2-hydroxyethyl methacrylate, 2-hydroxypropyl acrylate, 2-hydroxypropyl methacrylate, etc. Further, the monomer having an amino group includes, for example, dimethylaminoethyl acrylate, dimethylaminoethyl methacrylate, diethylaminoethyl acrylate, diethylaminoethyl methacrylate, etc.

The oligomer to be used in this invention is preferably one which has a molecular weight in the range from $3 \times 10^3$ to $5 \times 10^4$ as measured by high-speed liquid chromatography which is an ordinary measurement method and a viscosity in the range from $10^2$ cps to $5 \times 10^5$ cps at room temperature. When the molecular weight is lower than $3 \times 10^3$, the resulting coating film is hard and brittle, and when the molecular weight exceeds $5 \times 10^4$, the viscosity increases, so that coating becomes difficult therefore, both are not desirable. Although such a liquid oligomer is applied to a substrate usually in a nonsolvent condition, a small amount of a solvent may be added if necessary.

As the thiol compound, there can be used lauryl mercaptan, ethylene glycol dithioglycolate, 1,4-butanediol dithiopropionate, 1,6-hexanediol dithiopropionate, trimethylolpropane tris(thioglicolate), trimethylolpropane tris($\beta$-thiopropionate), pentacrythritol tetrakis(thioglycolate), etc. These thiol compounds can be used alone or as a mixture thereof.

The thiol compound is preferably used in an amount of 0.2 to 20 parts by weight per 100 parts by weight of the liquid oligomer. If the amount is lower than 0.2 part by weight, the control of prevention of crosslinking becomes insufficient, while if the amount is more than 20 parts by weight, adhesive properties are influenced badly due to insufficient curing and insufficient cohesion.

The pressure sensitive adhesive composition may further contain one or more conventionally used radically crosslinkable monomers, adhesion imparting agents, and if necessary one or more softening agents, antioxidants, fillers, pigments and the like additives.

As the substrate, there can be used a continuous film made from polyester, polyethylene, polypropylene, polyvinyl chloride, etc.

As the quaternary ammonium salt, there can be used trioctylmethylammonium chloride, dilauryldimethylammonium chloride, lauryltrimethylammonium chloride, coconut oil-trimethylammonium chloride, tallow-trimethylammonium chloride, trimethylbenzylammonium chloride, and the like. These quaternary ammonium salts can be used alone or as a mixture thereof.

Since these quaternary ammonium salts are liquid or powder at ordinary state, these can be coated on the substrate by using a roll coater, a static coater, etc. It is also possible to dilute these quaternary ammonium salts with a solvent such as a conventional organic solvent for coating.

The amount of quaternary ammonium salt to be coated changes depending on the amount of the adhesive composition to be coated and usually about 0.01 to 5 g/m². The action of the quaternary ammonium salt is not known clearly, but since there can be obtained good radiation curable properties, high cohesion, adhesive strength as well as no thiol odor by using the quaternary ammonium salt as undercoating, the quaternary ammonium salt seems to act as a catalyst for radiation polymerization of the oligomer (unsaturated double bonds) and thiol compound.

As the radiation, there can be used active energy rays such as $\alpha$-rays, $\beta$-rays, $\gamma$-rays, neutron rays, ionizing accelerated rays such as accelerated electron rays, as well as ultraviolet rays. The dosage of such a radiation is usually 0.5 to 50 Mrad.

In the case of irradiation, the irradiation atmosphere should particularly be taken care of. That is, since radicals generated are inhibited by oxygen in the air, the oxygen should be removed by, for example, replacing the air by an inert gas such as nitrogen or covering the film to be exposed to radiation with another film.

This invention is illustrated by way of the following Examples, in which all parts are by weight unless otherwise specified.

EXAMPLE 1, COMPARATIVE EXAMPLE 1

A powder of trimethylbenzylammonium chloride (mfd. by Wako Pure Chemical Industries, Ltd.) was diluted with toluene to give a 5% solution, which was undercoated on a polyester film (Lumilar #25, a trade name, mfd. by Toray Industries, Inc.) having a thickness of 0.025 mm in an amount of 2 g/m². Then, a radiation curable pressure sensitive adhesive composition (viscosity: about $10^4$ cps at 30° C.) comprising 100 parts of acrylic oligomer having acryloyl groups at side chains and 10 parts of 1,4-butanediol dithiopropionate was coated on the undercoating thus obtained so as to make the film thickness 15 µm. The resulting film was exposed to electron rays with a dosage of 5 Mrad from a linear filament type electron rays irradiating apparatus (Electron Curtain, a trade name, mfd. by Energy Science Co., Ltd.) with an accelerated voltage of 175 kV and beam current of 5 mA, under a nitrogen atmosphere (oxygen concentration 500 ppm) to conduct polymerization and crosslinking. Thus, the adhesive tape of Example 1 was produced.

An adhesive tape was produced in the same manner as mentioned above except for omitting the undercoating of quaternary ammonium salt (Comparative Example 1).

Properties of the adhesive tapes thus produced were tested and shown in Table 1.

TABLE 1

| Example No. | Example 1 | Comparative Example 1 |
| --- | --- | --- |
| Initial peel strength*[1] (g/25 mm wide) | 420 | 400 |
| Change of peel strength with the lapse of time*[2] (%) | 115 | 150 |
| Cohesion test*[3] (mm/10 mm × 20 mm) | 0.02 | 0.04 |
| Unpleasant odor | None | Yes |

Note
*[1]Measured according to JIS C-2107 (adherend: a stainless steel plate of SUS 430 BA)
*[2]An accelerating test on exposure at room temperature and atmosphere was conducted for 7 days under a hot atmosphere at 65° C. and an increasing rate of peel strength was shown. (The less the increasing rate, the better the adhesive property.)
*[3]By using as adherend a phenol resin plate, a distance of adhesive tape displacement was measured under a load of 500 g at 20° C. for 30 minutes.

As is clear from Table 1, the adhesive tape obtained in Example 1 has no unpleasant odor due to the thiol compound with constant peel strength only slightly changed with the lapse of time.

EXAMPLE 2, COMPARATIVE EXAMPLE 2

Trioctylmethylammonium chloride (Alignat 336, a trade name, mfd. by Henkel Japan, Co., Ltd.) was undercoated on a polyethylene film having a thickness of 0.06 mm in an amount of 0.15 g/m². Then, a radiation curable pressure sensitive adhesive composition (viscosity: $5 \times 10^3$ cps at 30° C.) comprising 100 parts of polyacrylate oligomer having acryloyl groups at both ends and 10 parts of trimethylolpropane tris(thioglycolate) was coated on the undercoating thus obtained so as to make the film thickness 4 µm. Using the same electron rays irradiating apparatus as used in Example 1 under the same conditions as described in Example 1, an adhesive film for surface protection was produced (Example 2).

An adhesive tape was produced in the same manner as mentioned above except for omitting the undercoating of quaternary ammonium salt (Comparative Example 2).

Properties of the adhesive tapes thus produced were tested and shown in Table 2.

TABLE 2

| Example No. | Example 2 | Comparative Example 2 |
|---|---|---|
| Initial peel strength (g/25 mm wide) | 180 | 170 |
| Change of peel strength with the lapse of time (%) | 110 | 145 |
| Erichsen squeezing test*[4] | No abnormal | Abnormal |
| Unpleasant odor | None | Yes |

Note
*[4] A stainless steel (SUS) plate to which each adhesive film had been attached was subjected to a 8 mm erichsen squeezing test according to JIS B-7777, and the state of the film naturally peeled off after stood for 1 day at room temperature was observed.

As is clear from Table 2, the adhesive tape obtained in Example 2 has no unpleasant odor due to the thiol compound, constant peel strength only slightly changed with the lapse of time, and good squeezing properties.

As mentioned above, according to this invention, the adhesive tape produced by coating as an undercoating a quaternary ammonium salt on a surface of a tape substrate, coating a radiation curable pressure sensitive adhesive composition comprising a radiation curable liquid oligomer and a thiol compound on the undercoating, and curing the adhesive composition with irradiation of radiation, has no unpleasant odor, high cohesion and excellent peel strength. Such excellent properties are not influenced even if the radiation curable pressure sensitive adhesive composition further comprises one or more acrylic monomers having an acidic group such as acrylic acid, methacrylic acid, acryloyloxyethyl hydrogenphthalate, 2-acrylamide-2-methylpropane-sulfonic acid, 3-chloro-2-acidophosphoxypropyl methacrylate, 2-acidophosphoxyethyl acrylate, 2-acidophosphoxypropyl methacrylate, di(2-methacryloyloxyethyl) phosphate, di(2-acryloyloxyethyl) phosphate, etc., preferably in an amount of 0.5 to 30 parts by weight per 100 parts by weight of the liquid oligomer.

What is claimed is:

1. In a process for producing a radiation curable adhesive tape by coating a pressure sensitive adhesive composition comprising a liquid oligomer having one or more radically crosslinkable unsaturated double bonds in its molecule and a thiol compound on a surface of substrate and exposing said composition to radiation, the improvement which comprises coating as an undercoating a quaternary ammonium salt on a surface of substrate before the coating of the pressure sensitive adhesive composition.

2. A process according to claim 1, wherein the quaternary ammonium salt is at least one member selected from the group consisting of trioctylmethylammonium chloride, dilauryldimethylammonium chloride, lauryltrimethylammonium chloride, coconut oil-trimethylammonium chloride, tallow-trimethylammonium chloride and timethylbenzylammonium chloride.

3. A process according to claim 1, wherein the quaternary ammonium salt is coated on a surface of substrate in an amount of 0.01 to 5 g/m$^2$.

4. A process according to claim 1, wherein the quaternary ammonium salt is used as a solution, if necessary, with an organic solvent.

5. A process according to claim 3, wherein the substrate is a polyethylene film, a polyester film, a polypropylene film, or a polyvinyl chloride film.

6. A process according to claim 1, wherein the adhesive composition further comprises one or more acrylic monomers having an acidic group.

* * * * *

UNITED STATES PATENT AND TRADEMARK OFFICE
CERTIFICATE OF CORRECTION

PATENT NO. : 4,554,174
DATED : November 19, 1985
INVENTOR(S) : Ohta et al.

It is certified that error appears in the above-identified patent and that said Letters Patent is hereby corrected as shown below:

Title page, left-hand column:
"[73] Assignee: Hitachi Chemical Company, Tokyo," should read --[73] Assignee: Hitachi Chemical Company, Ltd., Tokyo,--

Signed and Sealed this

Eighteenth Day of March 1986

[SEAL]

Attest:

DONALD J. QUIGG

Attesting Officer

Commissioner of Patents and Trademarks